United States Patent
Nakano et al.

(10) Patent No.: US 10,224,853 B2
(45) Date of Patent: Mar. 5, 2019

(54) AC ROTARY MACHINE CONTROLLER

(71) Applicant: Mitsubishi Electric Corporation, Tokyo (JP)

(72) Inventors: Kotaro Nakano, Tokyo (JP); Noriyuki Wada, Tokyo (JP); Yasufumi Ogawa, Tokyo (JP); Daiki Matsuura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 11 days.

(21) Appl. No.: 15/866,705

(22) Filed: Jan. 10, 2018

(65) Prior Publication Data

US 2018/0367076 A1    Dec. 20, 2018

(30) Foreign Application Priority Data

Jun. 20, 2017    (JP) ................ 2017-120139

(51) Int. Cl.

| | |
|---|---|
| *H02P 6/08* | (2016.01) |
| *H02P 21/30* | (2016.01) |
| *G01D 5/20* | (2006.01) |
| *H02P 23/14* | (2006.01) |
| *H02P 6/18* | (2016.01) |
| *H02P 21/18* | (2016.01) |
| *H02P 6/06* | (2006.01) |
| *H02P 6/17* | (2016.01) |
| *H02P 27/08* | (2006.01) |

(52) U.S. Cl.
CPC ............ *H02P 21/30* (2016.02); *G01D 5/20* (2013.01); *H02P 6/06* (2013.01); *H02P 6/17* (2016.02); *H02P 6/183* (2013.01); *H02P 21/18* (2016.02); *H02P 23/14* (2013.01); *H02P 27/085* (2013.01)

(58) Field of Classification Search
CPC ......... B60L 2240/423; B60L 2240/421; B60L 2210/40; H02P 6/08; H02P 27/06; H02P 21/18; H02P 23/14; H02P 6/06
See application file for complete search history.

(56) References Cited

U.S. PATENT DOCUMENTS

| | | | | |
|---|---|---|---|---|
| 4,672,288 A | * | 6/1987 | Abbondanti | .......... H02P 27/048 318/803 |
| 6,756,758 B2 | * | 6/2004 | Karikomi | ............... G05D 19/02 180/197 |
| 2011/0148335 A1 | * | 6/2011 | Harakawa | ............... H02P 21/06 318/400.02 |

(Continued)

FOREIGN PATENT DOCUMENTS

JP    2007-274781 A    10/2007

*Primary Examiner* — Thai Dinh
(74) *Attorney, Agent, or Firm* — Sughrue Mion, PLLC; Richard C. Turner

(57) ABSTRACT

To provide an AC rotary machine controller which can improve setting accuracy of torque command correction value in a region where change of torque command correction value to change of rotational speed and torque becomes large and where nonlinearity is high, and can suppress increase in data amount of correction value setting map. In correction value setting map, one or both of a torque axis unequal interval setting that sets interval of the torque command map axis to unequal interval in each rotational speed; and a rotation axis unequal interval setting that sets interval of the rotational speed map axis to unequal interval were done.

9 Claims, 16 Drawing Sheets

(56) References Cited

U.S. PATENT DOCUMENTS

2012/0245773 A1\* 9/2012 Suzuki .................... B60L 15/20
                   701/22
2015/0180386 A1\* 6/2015 Enoki ....................... H02P 6/10
                   318/400.23

\* cited by examiner

| Tm | ω | dTm |
|----|---|-----|
| ○○ | ○○ | ○○ |
| ○○ | ○○ | ○○ |
| ○○ | ○○ | ○○ |
| ○○ | ○○ | ○○ |
| . | . | . |
| . | . | . |
| . | . | . |
| ○○ | ○○ | ○○ |

FIG. 14

|  |  | ROTATIONAL SPEED AXIS | | | | | | |
|---|---|---|---|---|---|---|---|---|
|  |  | 0 | 500 | 1000 | ... | 39800 | 39900 | 40000 |
| TORQUE RATIO AXIS (TORQUE AXIS) | 0 | OO | OO | OO | ... | OO | OO | OO |
|  | 0.2 | OO | OO | OO | ... | OO | OO | OO |
|  | 0.4 | OO | OO | OO | ... | OO | OO | OO |
|  | 0.6 | OO | OO | OO | ... | OO | OO | OO |
|  | 0.8 | OO | OO | OO | ... | OO | OO | OO |
|  | 0.88 | OO | OO | OO | ... | OO | OO | OO |
|  | 0.94 | OO | OO | OO | ... | OO | OO | OO |
|  | 0.98 | OO | OO | OO | ... | OO | OO | OO |
|  | 1 | OO | OO | OO | ... | OO | OO | OO | dTm

AC ROTARY MACHINE CONTROLLER

INCORPORATION BY REFERENCE

The disclosure of Japanese Patent Application No. 2017-120139 filed on Jun. 20, 2017 including its specification, claims and drawings, is incorporated herein by reference in its entirety.

BACKGROUND

The present disclosure relates to an AC rotary machine controller for controlling an AC rotary machine via an inverter.

With regard to the above AC rotary machine controller, the technology described in JP-A-2007-274781 is already known. The technology of JP-A-2007-274781 is configured to correct the torque command in order to compensate deviation of the output torque of the AC rotary machine from the torque command. The technology of JP-A-2007-274781 is configured to calculate the correction value of the torque command, using the correction value setting map in which the rotational speed and the torque command are set as map axes.

SUMMARY

By the way, inductance, iron loss resistance, and the like, which influence the torque output characteristic, may change according to operating conditions such as the rotational speed and the torque. Control operation changes according to operating conditions. Therefore, depending on region of the rotational speed and the torque, nonlinearity that the change of the torque command correction value to the change of the rotational speed and the torque becomes large becomes high. In a region of rotational speed and torque where nonlinearity becomes high, it is necessary to set interval of the map axes finely to improve setting accuracy of the correction value of the torque command. On the other hand, if interval of the map axes is set finely in all regions, there was a problem that data amount of the correction value setting map increases.

However, in the technology of JP-A-2007-274781, as shown in FIG. 5 of JP-A-2007-274781, interval of the rotational speed map axis is set equally, and interval of the torque command map axis is set equally in each rotational speed. Therefore, in the technology of JP-A-2007-274781, fine setting of interval of the map axes is not performed only in partial region where nonlinearity is high, and setting accuracy of the correction value of the torque command cannot be improved; alternatively, if interval of the map axes is set finely in all regions, it invites the increase in data amount.

Thus, it is desirable to provide an AC rotary machine controller which can improve setting accuracy of the correction value of the torque command in a region of the rotational speed and the torque where the change of the torque command correction value to the change of the rotational speed and the torque becomes large, and can suppress the increase in data amount of the correction value setting map.

An AC rotary machine controller according to the present disclosure is an AC rotary machine controller for controlling an AC rotary machine via an inverter including:

a torque command setting calculator that sets a torque command;

a torque command correction calculator that calculates a torque command correction value based on the torque command and a rotational speed of the AC rotary machine, and calculates a torque command after correction obtained by correcting the torque command by the torque command correction value; and an inverter controller that controls on/off of a plurality of switching devices which the inverter has, based on the torque command after correction, wherein the torque command correction calculator calculates the torque command correction value corresponding to the present torque command and the present rotational speed, by referring to a correction value setting map in which the torque command and the rotational speed were set as map axes, and the torque command correction value was set as map setting data, and wherein in the correction value setting map, one or both of a torque axis unequal interval setting that sets interval of torque command map axis to unequal interval in the each rotational speed; and a rotation axis unequal interval setting that sets interval of rotational speed map axis to unequal interval were done.

According to the AC rotary machine controller of the present disclosure, in the region of the rotational speed and the torque where the change of the torque command correction value to the change of the rotational speed and the torque becomes large, the interval of the map axes is set more finely than the other region, the setting accuracy of the torque command correction value is improved, and the deviation of the output torque to the torque command can be compensated with good accuracy. In the other range where the change becomes small, since the interval of the map axes can be set roughly, increase in data amount of the correction value setting map can be suppressed.

BRIEF DESCRIPTION OF THE DRAWINGS

FIG. 0.13 is an explanation drawing of a correction value setting map in which a torque command ratio is set as map axis according to Embodiment 1 of the present disclosure;

FIG. 14 is an explanation drawing of setting data of a correction value setting map in which a torque command ratio is set as map axis according to Embodiment 1 of the present disclosure;

DETAILED DESCRIPTION OF THE EMBODIMENTS

1. Embodiment 1

Figure 1:
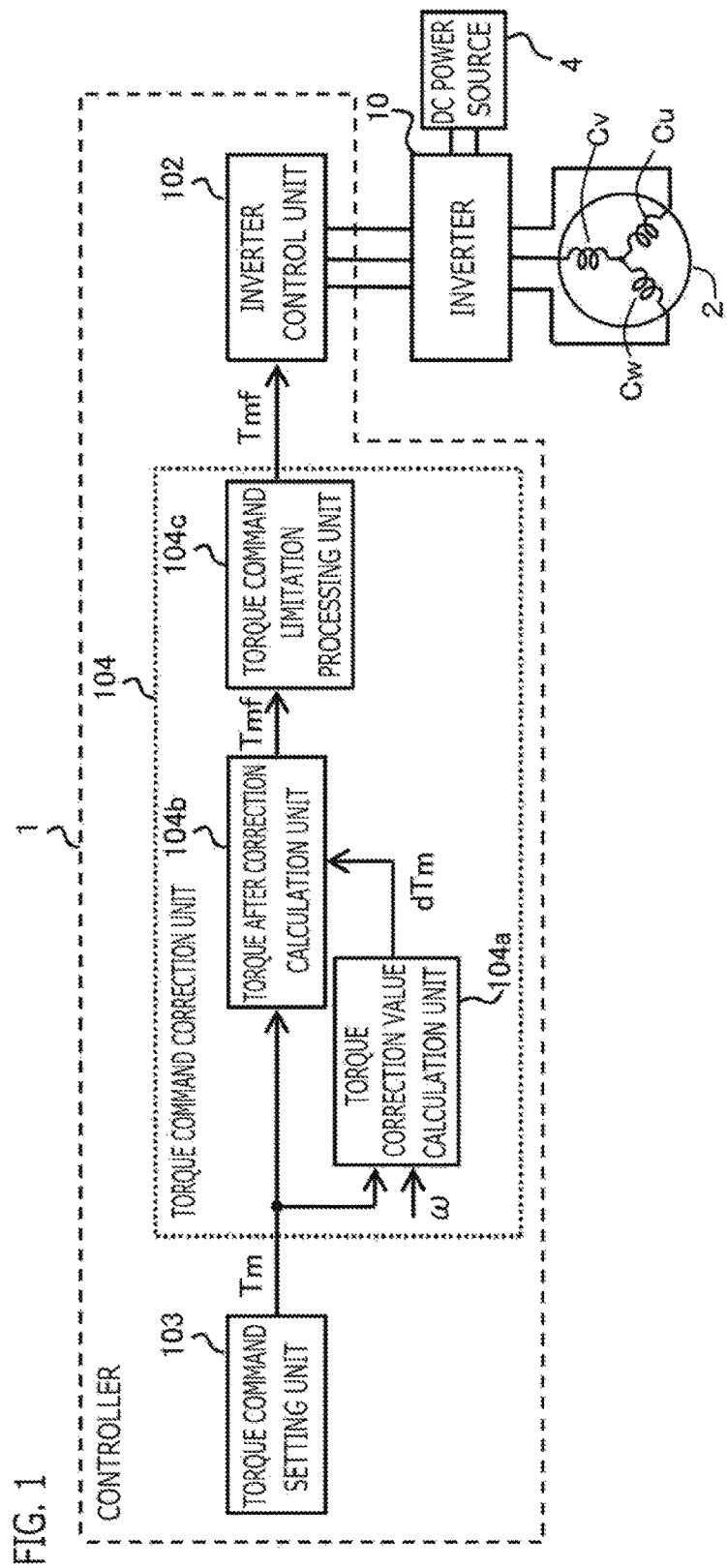
FIG. 1 is a schematic configuration diagram of an AC rotary machine and an AC rotary machine controller according to Embodiment 1 of the present disclosure.

An AC rotary machine controller 1 (hereinafter, referred to simply as the controller 1) according to Embodiment 1 will be explained with reference to the drawings. FIG. 1 is a schematic configuration diagram of the controller 1 and an AC rotary machine 2 according to the present embodiment.

The AC rotary machine 2 is provided with a stator fixed to a nonrotation member, and a rotor which is disposed at the radial-direction inner side of the stator and is pivotably supported by a nonrotation member. In the present embodiment, the AC rotary machine 2 is a rotary machine of the permanent magnet synchronous type, the stator is provided with three phase windings Cu, Cv, Cw, and the rotor is provided with permanent magnets. The AC rotary machine 2 is electrically connected to a DC power source 4 via an inverter 10 which performs a DC/AC conversion. The AC rotary machine 2 has at least the function of an electric motor which receives electric power supplied from the DC power source 4 and generates power. The AC rotary machine 2 may have the function of a generator in addition to the function of the electric motor.

The inverter 10 is a DC/AC conversion device that performs electric power conversion between the DC power source 4 and the AC rotary machine 2. The inverter 10 is configured into a bridge circuit in which three sets of two switching devices, which are connected in series between a positive pole wire connected to a positive pole of the DC power source 4 and a negative pole wire connected to a negative pole of the DC power source 4, are provided correspondingly to the windings of each phase of three phases (U phase, V phase, W phase). A connection node connected in series to the positive pole side switching device and the negative pole side switching device is connected to the winding of the corresponding phase. An IGBT (Insulated Gate Bipolar Transistor) in which a free wheel diode is connected in reversely parallel, a MOSFET (Metal Oxide Semiconductor Field Effect Transistor), and the like are used for the switching device.

Figure 3:
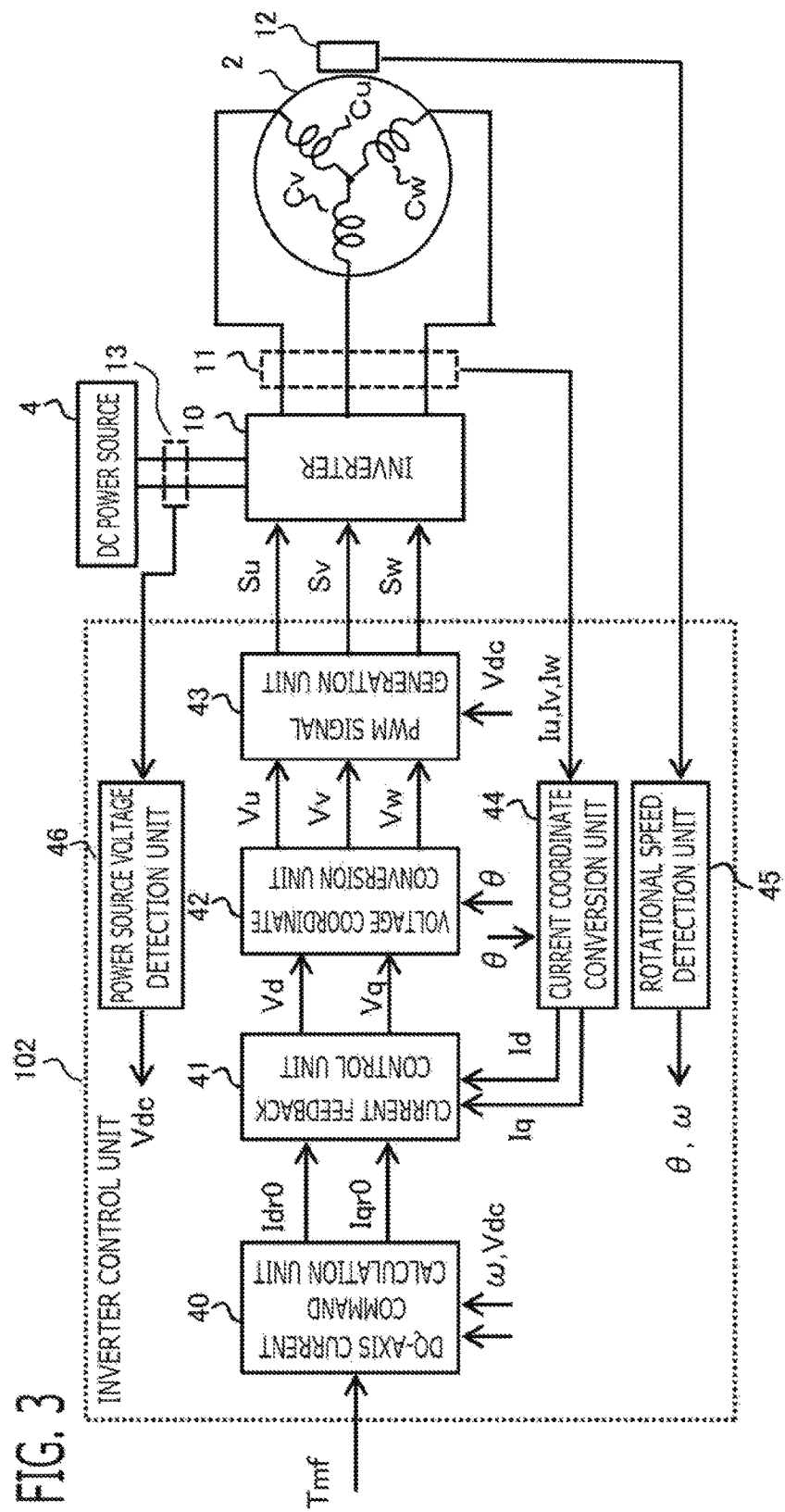
FIG. 3 is a block diagram of an inverter control unit according to Embodiment 1 of the present disclosure.

As shown in FIG. 3, the inverter 10 is provided with a current sensor 11 for detecting current which flows into each winding. The current sensor 11 is provided on the wire of each phase which connects the series circuit of the switching devices and the winding. The inverter 10 is provided with a power source voltage sensor 13 which detects a DC power voltage Vdc supplied to the inverter 10 from the DC power source 4. The power source voltage sensor 13 is provided between the positive pole wire and the negative pole wire.

Figure 2:
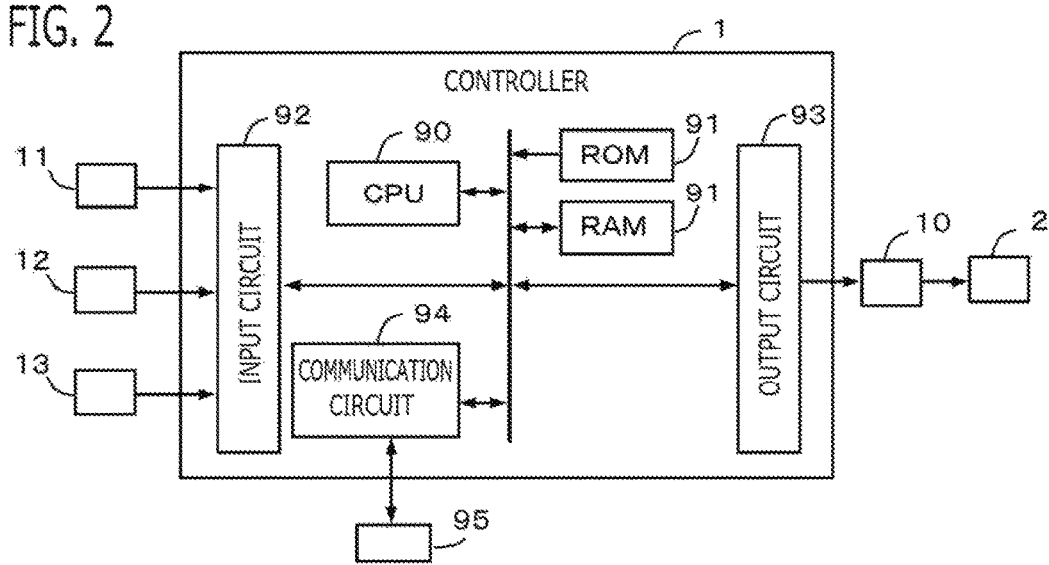
FIG. 2 is a hardware configuration diagram of an AC rotary machine controller according to Embodiment 1 of the present disclosure.

The controller 1 is a controller which controls the AC rotary machine 2 by controlling the inverter 10. As shown in FIG. 1, the controller 1 is provided with control units of a torque command setting unit 103, a torque command correction unit 104, an inverter control unit 102, and the like. Respective control units 102 through 104 and the like provided in the controller 1 are realized by a processing circuit included in the controller 1. Specifically, as illustrated in FIG. 2, the controller 1 includes, as processing circuits, a calculation processor (computer) 90 such as a CPU (Central Processing Unit), storage apparatuses 91 which exchange data with the calculation processor 90, an input circuit 92 which inputs external signals to the calculation processor 90, an output circuit 93 which outputs signals from the calculation processor 90 to the outside, a communication circuit 94 in which the calculation processor 90 performs data communication with external apparatuses, and the like.

As the calculation processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the calculation processor 90, a plurality of the same type ones or the different type ones may be provided, and each processing may be shared and executed. As the storage apparatuses 91, there are provided a RAM (Random Access Memory) which can read data and write data from the calculation processor 90, a ROM (Read Only Memory) which can read data from the calculation processor 90, and the like. The input circuit 92 is connected with various kinds of sensors and switches and is provided with an A/D converter and the like for inputting output signals from the sensors and the switches to the calculation processor 90. The output circuit 93 is connected with electric loads such as the switching devices, and is provided with a driving circuit and the like for outputting a control signal from the calculation processor 90. In the present embodiment, the input circuit 92 is connected to the current sensor 11, a rotational speed sensor 12, the power source voltage sensor 13, and the like. The output circuit 93 is connected to the inverter 10 (switching devices or a gate driving circuit of the switching devices). The communication circuit 94 is connected to an external controller 95, such as an integrated controller, via a communication wire, and performs cable communications based on various kinds of communications protocols.

Then, the calculation processor 90 runs software items (programs) stored in the storage apparatus 91 such as a ROM and collaborates with other hardware devices in the controller 1, such as the storage apparatus 91, the input circuit 92, and the output circuit 93, so that the respective functions of the control units 102 through 104 included in the controller 1 are realized. Setting data items such as maps and determination value to be utilized in the control units 102 through 104 are stored, as part of software items (programs), in the storage apparatus 91 such as a ROM. Each function of the controller 1 will be described in detail below.

<Inverter Control Unit 102>

As shown in the block diagram of FIG. 3, the inverter control unit 102 controls on/off of the plurality of switching devices which the inverter 10 has, based on a torque command after correction Tmf transmitted from the torque command correction unit 104 described below. In the present embodiment, the inverter control unit 102 performs current feedback control using a vector control method. The inverter control unit 102 calculates current commands which flows into the windings of the AC rotary machine 2, based on the torque command after correction Tmf; calculates voltage commands applied to the windings of the AC rotary machine 2 so that actual currents approach current commands; and controls on/off of the plurality of switching devices by PWM (Pulse Width Modulation) control based on the voltage commands. For that, the inverter control unit 102 is provided with a dq-axis current command calculation unit 40, a current feedback control unit 41, a voltage coordinate conversion unit 42, a PWM signal generation unit 43, a current coordinate conversion unit 44, a rotational speed detection unit 45, and a power source voltage detection unit 46.

The rotational speed detection unit 45 detects a rotational speed $\omega$ of the AC rotary machine 2. The rotational speed detection unit 45 detects an electrical angle $\theta$ (magnetic pole position $\theta$) of the rotor and an electrical angular speed as a rotational speed $\omega$, based on the output signal of the rotational speed sensor 12 provided in the rotation shaft of the rotor. The power source voltage detection unit 46 detects a DC power voltage Vdc based on the output signal of the power source voltage sensor 13.

The torque command after correction Tmf calculated by the torque command correction unit 104 is inputted into the dq-axis current command calculation unit 40. The dq-axis current command calculation unit 40 calculates a d-axis current command value Idr0 and a q-axis current command value Iqr0, in which currents that flow through the three phase windings Cu, Cv, Cw are expressed in a dq-axis rotating coordinate system, in order to make the AC rotary machine 2 output the torque of the torque command after correction Tmf.

The dq-axis rotating coordinate system consists of a d-axis defined in the direction of the N pole (magnetic pole position) of the permanent magnet provided in the rotor, and a q-axis defined in the direction advanced to d-axis by 90 degrees ($\pi/2$) in an electrical angle, and which is the two-axis rotating coordinate system which rotates synchronizing with rotation of the rotor in the electrical angle $\theta$.

Figure 4:
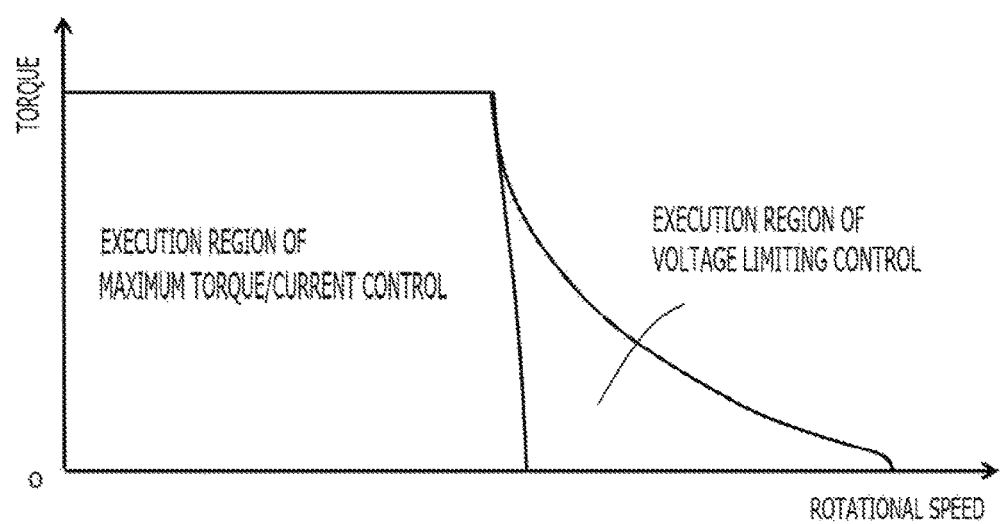
FIG. 4 is an explanation drawing for explaining selection process of control method according to Embodiment 1 of the present disclosure.

In the present embodiment, the dq-axis current command calculation unit 40 selects one control method from a plurality of control methods of the current vector control method according to operating condition of the AC rotary machine 2, and calculates the dq-axis current command values Idr0, Iqr0 in accordance with the selected control method. In the present embodiment, by referring to a control method selection map in which a relationship among the rotational speed w of the AC rotary machine 2, torque, and the control methods is preliminarily set as shown in FIG. 4, the dq-axis current command calculation unit 40 selects one control method corresponding to the present rotational speed $\omega$ of the AC rotary machine 2, and the torque command after correction Tmf. The dq-axis current command calculation unit 40 switches and performs maximum torque/current control or voltage limiting control, according to operating point of the rotational speed $\omega$ and the torque command.

Figure 5:
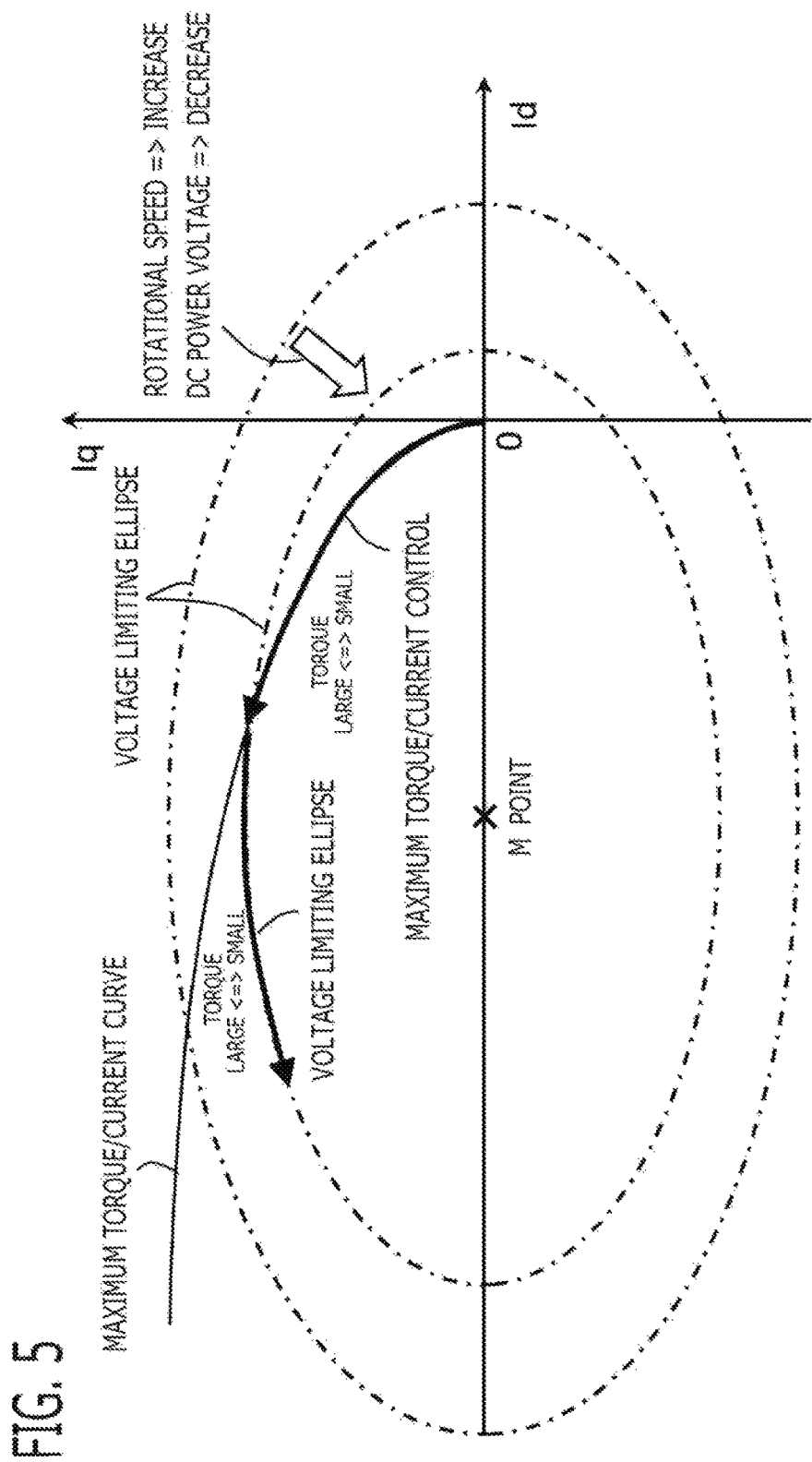
FIG. 5 is an explanation drawing for explaining setting of dq-axis current command values by maximum torque/current control and voltage limiting control according to Embodiment 1 of the present disclosure.

The maximum torque current control is a control method which calculates the dq-axis current command values Idr0, Iqr0 which maximizes a generated torque for the same current. The voltage limiting control is a control method which maintains an induced voltage generated in the windings of the AC rotary machine 2 at a voltage limiting value. As shown in FIG. 5, the maximum torque/current control is selected in the region where the torque command is small; and on a maximum torque/current curve on which a generated torque becomes the maximum for the same current, the d-axis current command value Idr0 is increased in the negative direction and the q-axis current command value Iqr0 is increased in the positive direction, as the torque command increases. Then, when the induced voltage of the AC rotary machine 2 reaches the voltage limiting value by increase of the torque command, the voltage limiting control is selected; and on a constant induced voltage ellipse corresponding to the voltage limiting value, the d-axis current command value Idr0 is increased in the negative direction and the q-axis current command value Iqr0 is increased in the positive or negative direction, as the torque command increases. The voltage limiting value is set to a value below the DC power voltage Vdc. For example, the voltage limiting value is set to a value obtained by multiplying a coefficient, which is set to a value less than or equal to one, to the DC power voltage Vdc. Alternatively, the voltage limiting value may be set to an upper limit voltage that components of the AC rotary machine 2 do not break down.

By referring to a torque current conversion map in which a relationship between the torque command and the dq-axis current command values Idr0, Iqr0 is preliminarily set, the dq-axis current command calculation unit 40 calculates the dq-axis current command values Idr0, Iqr0 corresponding to the torque command after correction Tmf. The torque current conversion map is provided for each of control methods. Instead of the torque current conversion map, an approximate expression may be used.

The current coordinate conversion unit 44 detects three phase currents Iu, Iv, Iw which flow through the respective phase windings Cu, Cv, Cw of the AC rotary machine 2 from the inverter 10, based on the output signal of the current sensor 11. The current coordinate conversion unit 44 converts the three phase currents Iu, Iv, Iw, which flow through the respective phase windings, into a d-axis current Id and a q-axis current Iq which are expressed in the dq-axis rotating coordinate system, by performing a three-phase/two-phase conversion and a rotating coordinate conversion based on the magnetic pole position $\theta$.

The current feedback control unit 41 performs current feedback control which changes a d-axis voltage command value Vd and a q-axis voltage command value Vq, which express voltage command signals applied to the AC rotary machine 2 in the dq-axis rotating coordinate system, by PI control or the like so that the dq-axis currents Id, Iq approach to the dq-axis current command values Idr0, Iqr0. Feedforward control for non-interfering between the d-axis current and the q-axis current and the like may be performed.

After that, the voltage coordinate conversion unit 42 converts the dq-axis voltage command values Vd, Vq into three phase AC voltage command values Vu, Vv, Vw which are AC voltage command values to the respective three phase windings, by performing a fixed coordinate conversion and a two-phase/three-phase conversion based on the magnetic pole position $\theta$.

Figure 6:
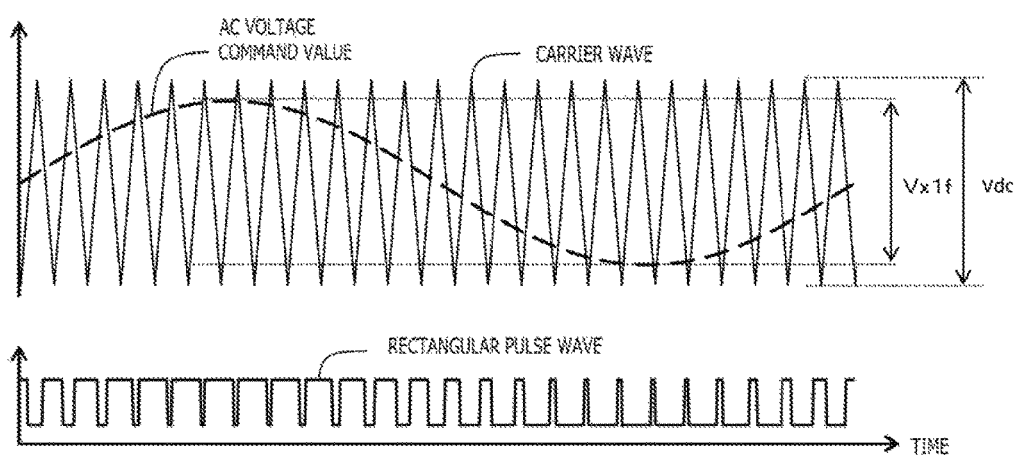
FIG. 6 is a timing chart for explaining generation process of PWM signal according to Embodiment 1 of the present disclosure.

As one phase is shown in FIG. 6, the PWM signal generation unit 43 compares each of the three phase AC voltage command values Vu, Vv, Vw with a carrier wave (triangular wave) which has a amplitude of the DC power voltage Vdc and oscillates at a carrier frequency; turns on a rectangular pulse wave when the AC voltage command values exceed the carrier wave, and turns off the rectangular pulse wave when the AC voltage command values fall below the carrier wave. The PWM signal generation unit 43 outputs the rectangular pulse waves of respective three phases as inverter control signals Su, Sv, Sw of respective three phases to the inverter 10, and turns on/off the respective switching devices of the inverter 10.

<Torque Command Setting Unit 103>

The torque command setting unit 103 sets a torque command Tm. In the present embodiment, the torque command setting unit 103 sets the torque command Tm based on the torque command transmitted from the external controller 95. The torque command setting unit 103 may set the torque command Tm by rotational speed feedback control, and may superimpose a vibration component on the torque command Tm.

<Torque Command Correction Unit 104>

As shown in FIG. 1, the torque command correction unit 104 is provided with a torque correction value calculation unit 104a that calculates a torque command correction value dTm based on the torque command Tm and the rotational speed w of the AC rotary machine, and a torque after correction calculation unit 104b that calculates a torque command after correction Tmf obtained by correcting the torque command with the torque command correction value dTm. The torque after correction calculation unit 104b calculates the torque command after correction Tmf by adding the torque command correction value dTm to the torque command Tm (Tmf=Tm+dTm).

In the present embodiment, the torque command correction unit 104 is provided with a torque command limitation processing unit 104c that applies limitation to the torque command after correction Tmf calculated by the torque after correction calculation unit 104b, so that the torque command does not become large without intention and does not change suddenly. For convenience of explanation, the torque command after limitation is also called the torque command after correction Tmf.

Inductance, iron loss resistance, and the like, which influence the torque output characteristic, may change according to operating conditions of the rotational speed ω, torque, and the like. Control operation changes according to operating condition. Therefore, even if the dq-axis current command values Idr0, Iqr0 are set based on the torque command and the AC rotary machine 2 is controlled, the output torque of the AC rotary machine 2 may shift from the torque command. According to the above-mentioned torque command correction unit 104, by calculating the torque command correction value dTm based on the torque command Tm and the rotational speed w of the AC rotary machine, and by correcting the torque command Tm, the deviation of the output torque from the torque command Tm, which occurs according to the operating condition of the rotational speed w and the torque, can be compensated.

The torque command correction unit 104a calculates the torque command correction value dTm corresponding to the present torque command Tm and the present rotational speed ω, by referring to a correction value setting map in which the torque command Tm and the rotational speed ω were set as map axes, and the torque command correction value dTm was set as map setting data.

Depending on region of the rotational speed ω and the torque, nonlinearity that the change of the torque command correction value dTm to the change of the rotational speed ω and the torque becomes large becomes high, it is desired to set interval of the map axes finely. Therefore, as shown in FIG. 7, in the correction value setting map, one or both (in this example, both) of a torque axis unequal interval setting that sets interval of the torque command map axis to unequal interval in the each rotational speed ω; and a rotation axis unequal interval setting that sets interval of the rotational speed map axis to unequal interval were done.

According to this configuration, in the region of the rotational speed ω and the torque where the change of the torque command correction value dTm to the change of the rotational speed ω and the torque becomes large, the interval of the map axes is set more finely than the other region, the setting accuracy of the torque command correction value dTm is improved, and the deviation of the output torque to the torque command Tm can be compensated with good accuracy. In the other region where the change becomes small, since the interval of the map axes can be set roughly, increase in data amount of the correction value setting map can be suppressed.

Figure 7:
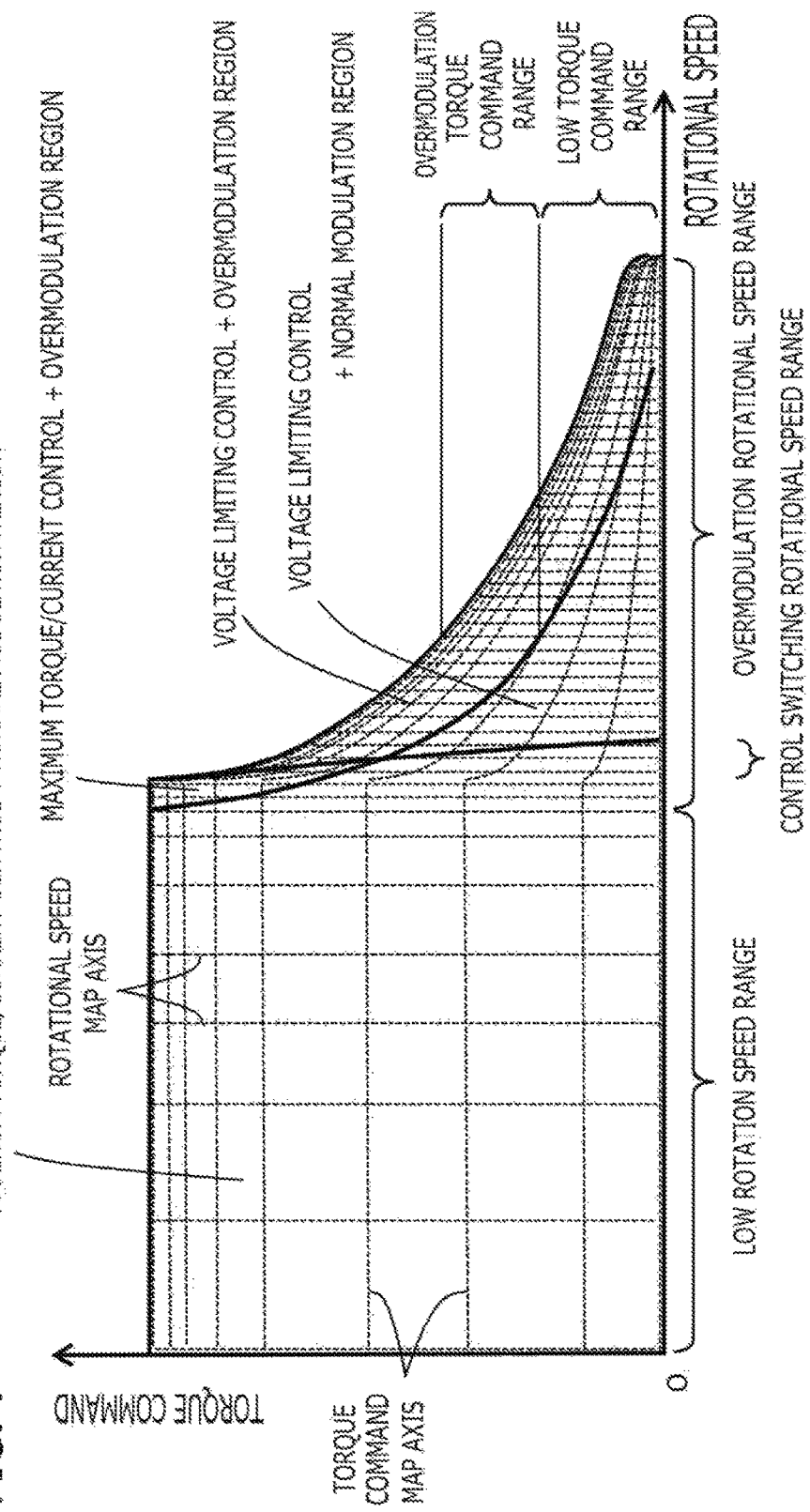
FIG. 7 is an explanation drawing of a correction value setting map according to Embodiment 1 of the present disclosure.
Figures 8, 9:
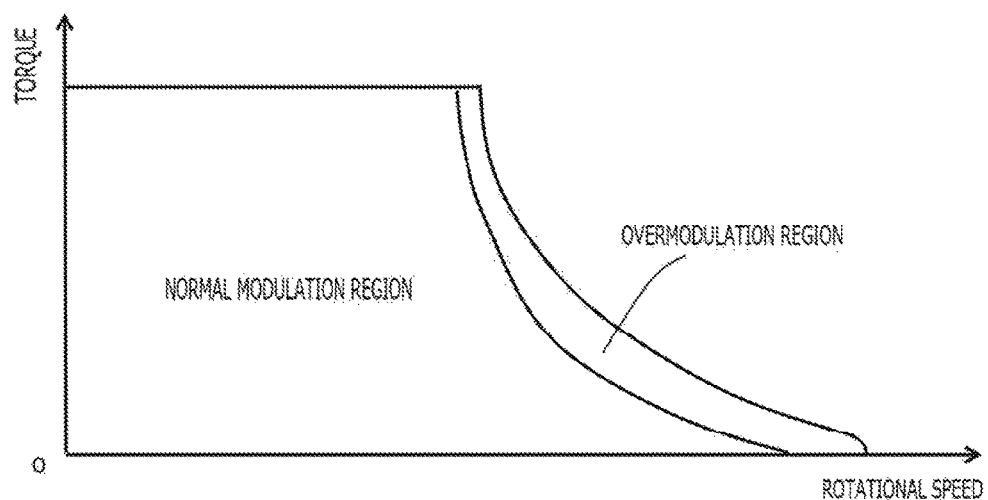
FIG. 8 is an explanation drawing of setting data of a correction value setting map according to Embodiment 1 of the present disclosure.
FIG. 9 is an explanation drawing of an overmodulation region according to Embodiment 1 of the present disclosure.

In FIG. 7, the torque command map axes and the rotational speed map axes are shown by the dotted line; and the torque command correction value dTm which is map setting data is set in each of coordinates where the torque command map axes and the rotational speed map axes intersect with each other. The setting value of the torque command correction value dTm is preliminarily set based on theoretical calculation, an experimental result, or the like, and the correction value setting map is stored in the storage apparatus 91, such as ROM. As shown in FIG. 8, the torque command correction value dTm corresponding to the each coordinate value of the torque command map axis and the rotational speed map axis is set.

The torque correction value calculation unit 104a reads the torque command correction values dTm of the four coordinate values of map axes nearest to the present torque command Tm and the present rotational speed ω, performs linear interpolation of the torque command correction values dTm of the four coordinate values based on the present coordinate value, and calculates the torque command correction value dTm corresponding to the present torque command Tm and the present rotational speed e.

<Subdivision of Map Axis in Overmodulation Region>

As shown in FIG. 9, a region where the rotational speed ω and the torque become large becomes an overmodulation region where amplitude Vx1f of the fundamental wave frequency component of the three phase AC voltages applied to the windings of the AC rotary machine becomes larger than the DC power voltage Vdc supplied to the inverter 10. In the overmodulation region, a voltage utilization factor MR, which is obtained by dividing the amplitude Vx1f of the fundamental wave frequency component of the three phase AC voltages by the DC power voltage Vdc as shown in the next equation, becomes larger than 1.

$$MR = Vx1f/Vdc \qquad (1)$$

Figure 10:
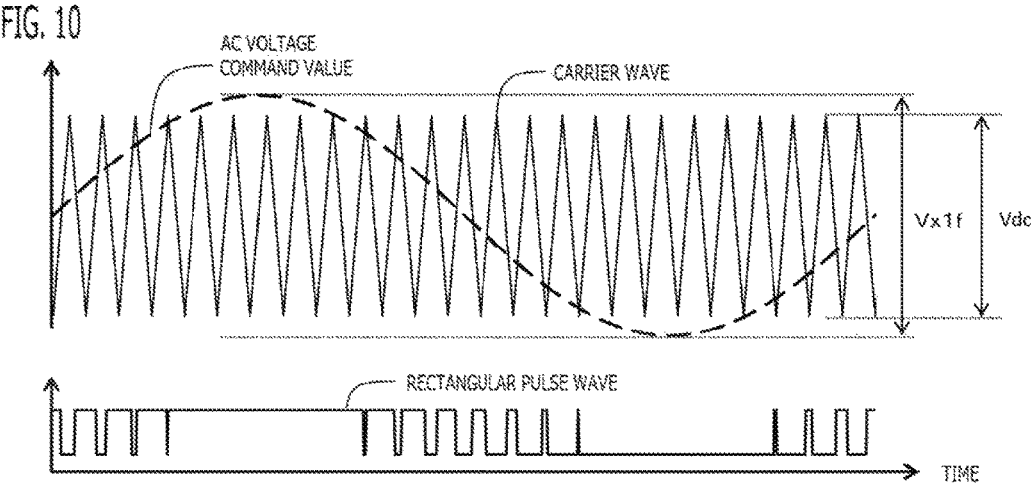
FIG. 10 is a timing chart for explaining generation process of PWM signal in an overmodulation region according to Embodiment 1 of the present disclosure.

In the present embodiment, as mentioned above, modulation such as two phase modulation PWM control described below in Embodiment 4 is not performed to the three phase AC voltage command values Vu, Vv, Vw after fixed coordinate conversion and two-phase/three-phase conversion; and the amplitude Vx1f of the fundamental wave frequency component of the three phase AC voltages becomes equal to an amplitude of the three phase AC voltage command values Vu, Vv, Vw which are sine waves. As shown in FIG. 10, when the voltage utilization factor MR becomes larger than one, period when the amplitude of the three phase AC voltage command values Vu, Vv, Vw exceed the carrier wave which is oscillating with the amplitude of the DC power voltage Vdc occurs; and in the excess period, the rectangular pulse wave is no longer turned on and off according to oscillation of the carrier wave, and is turned on or turned off continuously. Therefore, when the voltage utilization factor MR becomes larger than one, the AC voltages according to the three phase AC voltage command values Vu, Vv, Vw are no longer applied to the windings, and deviation of the output torque from the torque command becomes large. As the voltage utilization factor MR increases from 1, the excess period becomes long and deviation of the output torque becomes large. Therefore, also in the overmodulation region shown in FIG. 9, as the rotational speed ω and the torque become large, the voltage utilization factor MR increases from 1, and deviation of the output torque increases. Accordingly, in the overmodulation region, the change of deviation of the output torque to the change of the rotational speed ω and the torque becomes large, and the change of the torque command correction value dTm becomes large.

Therefore, in the present embodiment, as shown in FIG. 7, in the correction value setting map, one or both (in this example, both) of the rotation axis overmodulation subdivision setting and the torque axis overmodulation subdivision setting are performed. The rotation axis overmodulation subdivision setting is a setting that set the interval of the rotational speed map axis in an overmodulation rotational speed range more finely than that in a low rotation speed range where the rotational speed ω is lower than the overmodulation rotational speed range. The overmodulation rotational speed range is a range of the rotational speed ω which becomes the overmodulation region. The torque axis overmodulation subdivision setting is a setting that sets, in the each rotational speed ω, the interval of the torque command map axis more finely than that in a low torque command range where the torque command Tm is lower than the overmodulation torque command range. The overmodulation torque command range is a range of the torque command which becomes the overmodulation region.

According to this configuration, as described above, in the overmodulation region where the change of the torque command correction value dTm to the change of the rotational speed ω and the torque becomes large especially, the interval of the map axes is set more finely than the other range, the setting accuracy of the torque command correction value dTm is improved, and the deviation of the output torque to the torque command Tm can be compensated with good accuracy. In the other range where the change becomes small, since the interval of the map axes can be set roughly, increase in data amount of the correction value setting map can be suppressed.

In the present embodiment, in the correction value setting map, in the overmodulation torque command range of the each rotational speed ω, the interval of the torque command map axis is gradually set finely as the torque command becomes large.

According to this configuration, as described above, in the overmodulation region, as the torque becomes large, the voltage utilization factor MR increases from 1, deviation of the output torque increases, and the change of deviation of the output torque to the change of the torque becomes large. In accordance with these, the interval of a torque command map axis is set finely gradually, and deviation of the output torque can be compensated with good accuracy.

In the present embodiment, in the correction value setting map, also in the low rotation speed range, the interval of the rotational speed map axis is gradually set finely as the rotational speed ω approaches the overmodulation rotational speed range. According to this configuration, as approaching the overmodulation region, the change of the torque command correction value dTm to the change of rotational speed ω becomes large gradually. In accordance with this, the interval of the rotational speed map axis is set finely gradually, and deviation of the output torque to the torque command Tm can be compensated with good accuracy.

<Subdivision of Map Axis in Switching Region of Control Method>

In the correction value setting map, the interval of the rotational speed map axis in a control switching rotational speed range is set more finely than that in the low rotation speed range where the rotational speed ω is lower than the control switching rotational speed range. The control switching rotational speed range is a range of the rotational speed ω where the maximum torque/current control and the voltage-limiting control are switched.

Since the switching region of the maximum torque/current control and the voltage limiting control is a nonlinear region where the trend of the change of the torque command correction value dTm to the change of the rotational speed ω and the torque switches, it is desirable to set the interval of the map axes finely. According to the above-mentioned configuration, since the interval of the rotational speed map axis in the control switching rotational speed range is set more finely than that in the low rotation speed range, in the control switching region, the setting accuracy of the torque command correction value dTm is improved, and deviation of the output torque to the torque command Tm can be compensated with good accuracy.

In the example of FIG. 7 of the present embodiment, although the control switching rotational speed range is included in the above-mentioned overmodulation rotational speed range, if not included, in both of the control switching rotational speed range and the overmodulation rotational speed range, the interval of a rotational speed map axis may be set more finely than that in the low rotation speed range.

<Reduction of Data Amount of Map>

Figure 11:
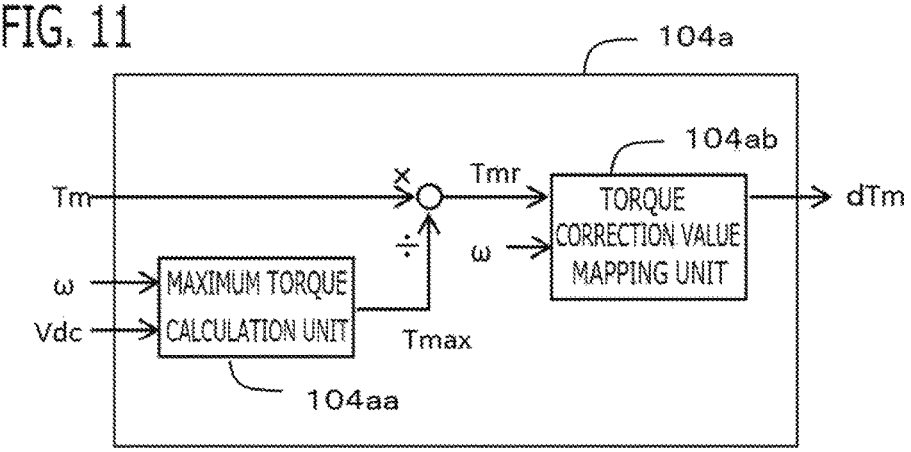
FIG. 11 is a block diagram of a torque correction value calculation unit according to Embodiment 1 of the present disclosure.
Figure 12:
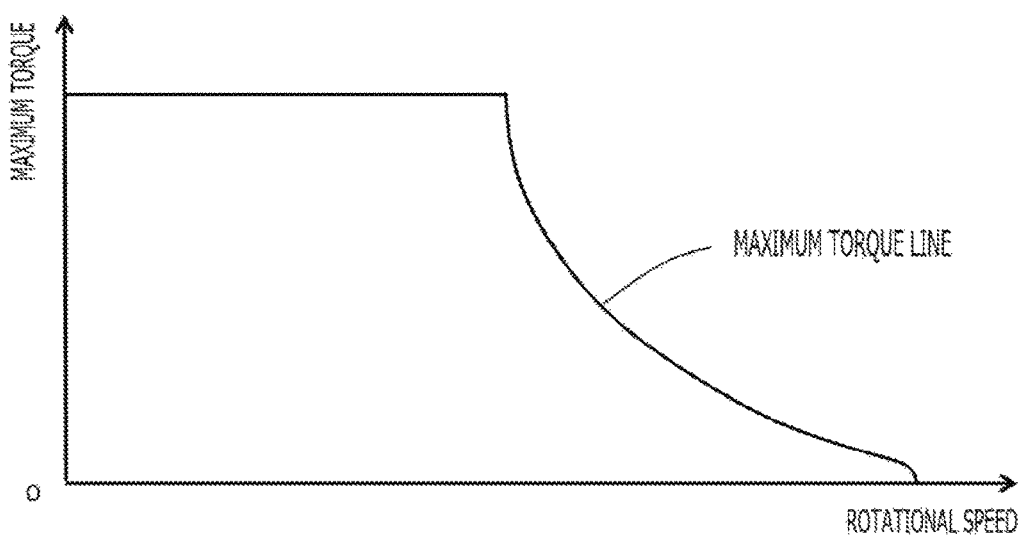
FIG. 12 is an explanation drawing for explaining setting processing of maximum torque according to Embodiment 1 of the present disclosure.

In the present embodiment, as shown in FIG. 11, the torque correction value calculation unit 104a is provided with a maximum torque calculation unit 104aa and a torque correction value mapping unit 104ab. As shown in FIG. 12, by referring to a maximum torque setting map in which a relationship among the rotational speed ω, the DC power voltage Vdc, and a maximum torque Tmax which the AC rotary machine 2 can output is preliminarily set, the maximum torque calculation unit 104aa calculates the maximum torque Tmax corresponding to the present rotational speed ω and the present DC power voltage Vdc. Then, the torque correction value calculation unit 104a calculates a torque command ratio Tmr obtained by dividing the present torque command Tm by the present maximum torque Tmax.

Figure 13:
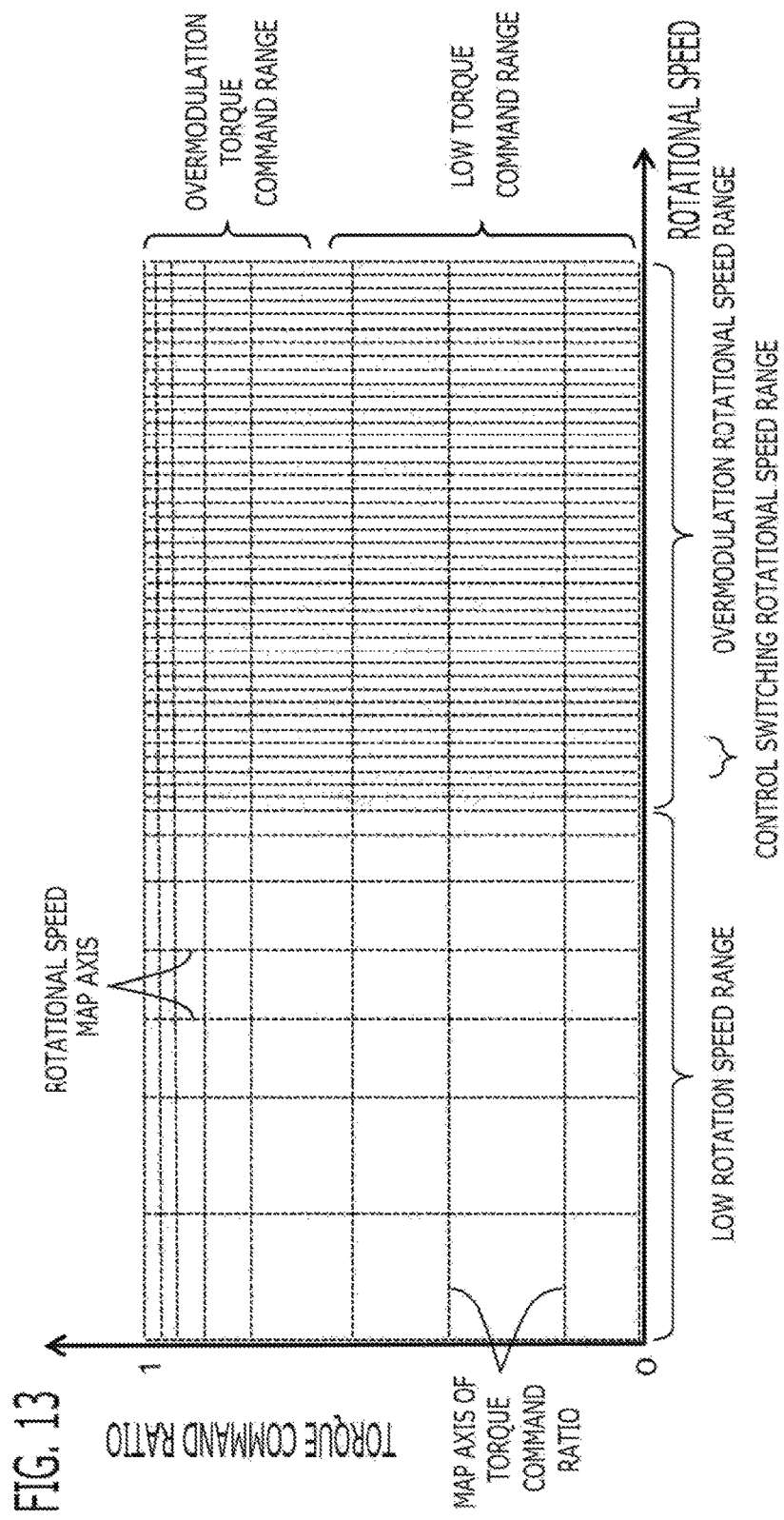

As shown in FIG. 13 and FIG. 14, by referring to a correction value setting map in which the torque command ratio Tmr was set as the torque command map axis, the rotational speed ω was set as the map axis, and the torque command correction value dTm was set as the map setting data, the torque correction value mapping unit 104ab calculates the torque command correction value dTm corresponding to the present torque command ratio Tmr and the present rotational speed ω.

According to this configuration, as shown in FIG. 8, it is not necessary to set coordinate values of the torque command ratio Tmr and the rotational speed ω for each setting value of the torque command correction value dTm; but, as shown in FIG. 14, coordinate values of one map axis of the torque command ratio Tmr communalized for all the rotational speed A can be set, and data amount of the correction value setting map can be reduced. And, coordinate values of one rotational speed map axis communalized for all the torque command ratios Tmr can be set.

2. Embodiment 2

Next, the controller 1 according to Embodiment 2 will be explained. The explanation for constituent parts the same as those in Embodiment 1 will be omitted. Although the basic configuration and processing of the AC rotary machine 2 and the controller 1 according to the present embodiment are the same as those of Embodiment 1, it differs in that a plurality of correction value setting maps are provided in order to correspond to change of the DC power voltage Vdc.

If a DC-DC converter is used for the DC power source 4, the DC power voltage Vdc changes according to a voltage boosting ratio or a voltage dropping ratio of the DC-DC converter. Alternatively, if a secondary battery is used for the DC power source 4, the DC power voltage Vdc changes according to electricity storage amount. Since the voltage utilization factor MR is in inverse proportion to the DC power voltage Vdc (MR is proportion to 1/Vdc), when the DC power voltage Vdc increases, the voltage utilization factor MR decreases also at the same rotational speed ω and the same torque command Tm. Therefore, when the DC power voltage Vdc increases, the overmodulation region shifts to the increase side of the rotational speed ω and the torque command Tm. When the DC power voltage Vdc increases, the voltage limiting value increases, and the switching region of the maximum torque/current control and the voltage limiting control shifts to the increase side of the rotational speed ω.

Then, a plurality of correction value setting maps are provided for respective plurality of DC power voltages Vdc which are different mutually. Then, in each of the plurality of correction value setting maps, the map axes are subdivided in accordance with the overmodulation region and the control switching region according to the corresponding DC power voltage Vdc.

By referring to the two correction value setting maps of the two DC power voltages Vdc near the present DC power voltage Vdc currently supplied to the inverter, the torque correction value calculation unit 104a calculates the two torque command correction values dTm1, dTm2. Then, the torque correction value calculation unit 104a calculates a value obtained by interpolating the two torque command correction values dTm1, dTm2 based on the present DC power voltage Vdc, as the final torque command correction value dTm.

Figure 15:
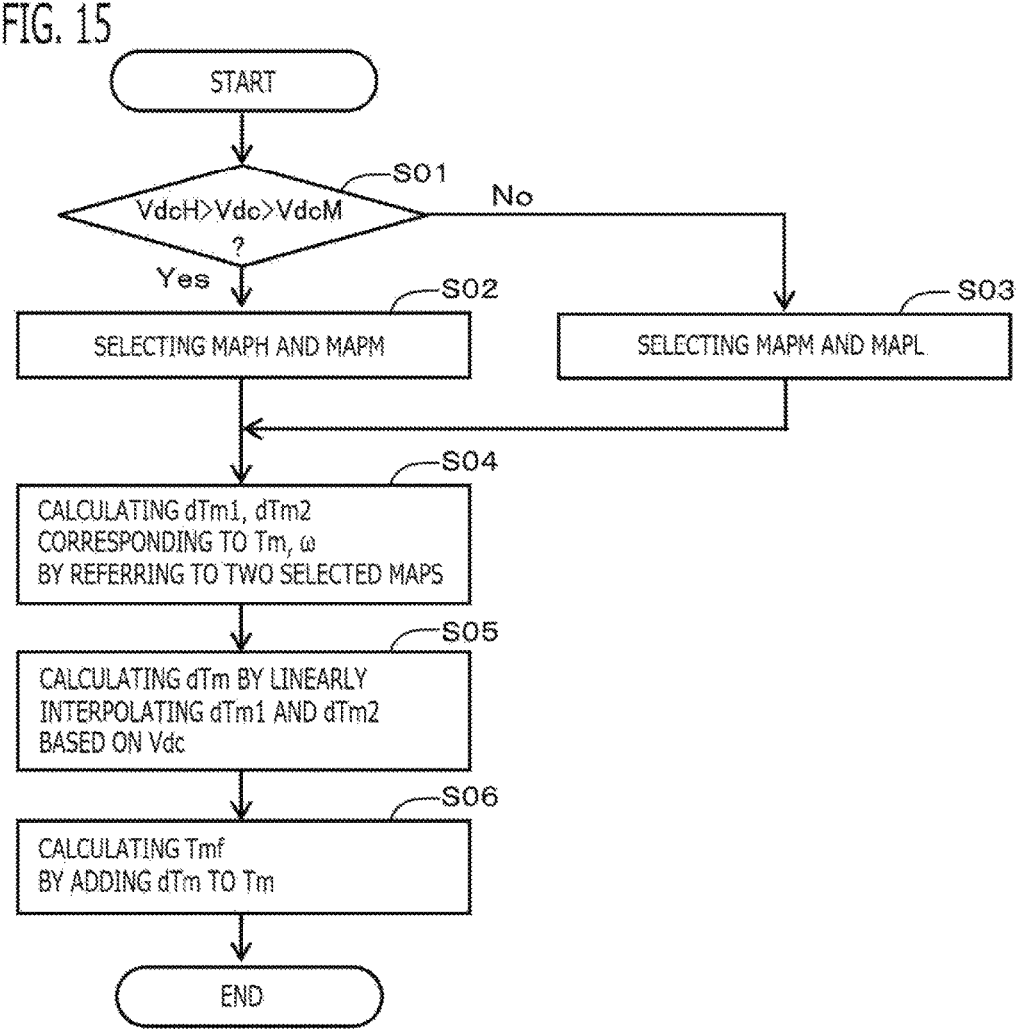
FIG. 15 is a flowchart showing processing of a torque correction value calculation unit according to Embodiment 2 of the present disclosure.

Hereinafter, using the flowchart of FIG. 15, a case where the three correction value setting maps MAPL, MAPM, MAPH of low, middle, high are provided for the three DC power voltages VdcL, VdcM, VdcH of low, middle, high, respectively will be explained (VdcH>VdcM>VdcL).

In the step S01, the torque correction value calculation unit 104a determines whether or not the present DC power voltage Vdc is between the high DC power voltage VdcH and the middle DC power voltage VdcM. In the case of determining that the present DC power voltage Vdc is between the high DC power voltage VdcH and the middle DC power voltage VdcM (the step S01: Yes), the torque correction value calculation unit 104a selects the high voltage correction value setting map MAPH and the middle voltage correction value setting map MAPM as the two correction value setting maps in the step S02. On the other hand, in the case of determining that the present DC power voltage Vdc is not between the high DC power voltage VdcH and the middle DC power voltage VdcM (the step S01: No), the torque correction value calculation unit 104a selects the middle voltage correction value setting map MAPM and the low voltage correction value setting map MAPL as the two correction value setting maps in the step S03, supposing that the present DC power voltage Vdc is between the middle DC power voltage VdcM and the low DC power voltage VdcL.

Then, in the step S04, by referring to each of the two correction value setting maps selected in the step S02 or the step S03, the torque correction value calculation unit 104a calculates the two torque command correction values dTm1, dTm2 corresponding to the present torque command Tm and the rotational speed ω.

In the step S05, the torque correction value calculation unit 104a calculates a value obtained by linearly interpolating the two torque command correction values dTm1, dTm2 based on the present DC power voltage Vdc, as the final torque command correction value dTm. For example, in the case of VdcH>Vdc>VdcM, the final torque command correction value dTm is calculated by linear interpolation of the next equation. Also in the case of Vdc>VdcH, the torque correction value calculation unit 104a may calculate the final torque command correction value dTm by extrapolation using the equation (2).

$$dTm=(Vdc-VdcM)/(VdcH-VdcM)\times(dTm1-dTm2)+dTm2 \quad (2)$$

Then, in the step S06, the torque correction value calculation unit 104a calculates a torque command after correction Tmf by adding the torque command correction value dTm to the torque command Tm, as shown in the next equation.

$$Tmf=Tm+dTm \quad (3)$$

3. Embodiment 3

Next, the controller 1 according to Embodiment 3 will be explained. The explanation for constituent parts the same as those in Embodiment 1 will be omitted. Although the basic configuration and processing of the AC rotary machine 2 and the controller 1 according to the present embodiment are the same as those of Embodiment 1, it differs in that a plurality of correction value setting maps are provided in order to correspond to change of the carrier frequency.

In the present embodiment, the PWM signal generation unit 43 changes the carrier frequency according to operating condition. By change of the carrier frequency of PWM control, iron loss resistance of the AC rotary machine 2 may change, and even if the torque command is the same, the output torque of the AC rotary machine 2 changes. Therefore, it is desirable to change the torque command correction value dTm according to change of the carrier frequency.

Then, a plurality of correction value setting maps are provided for respective plurality of carrier frequencies which are different mutually. Then, in each of the plurality of correction value setting maps, the map axes are subdivided in accordance with the overmodulation region and the control switching region.

The torque command correction unit 104a calculates the torque command correction value dTm, by referring to the correction value setting map of carrier frequency corresponding to the present carrier frequency.

Figure 16:
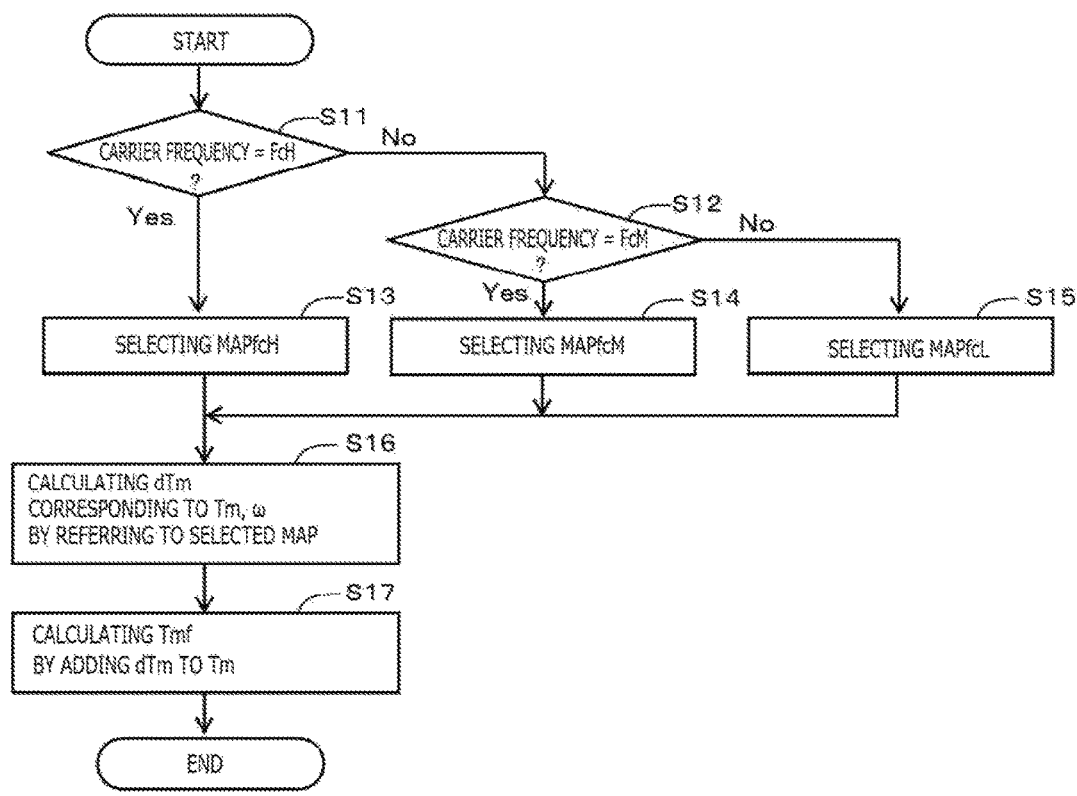
FIG. 16 is a flowchart showing processing of a torque correction value calculation unit according to Embodiment 3 of the present disclosure.

Hereinafter, using the flowchart of FIG. 16, the PWM signal generation unit 43 is configured to switch the carrier frequency to any one of the three carrier frequencies FcL, FcM, FcH of low, middle, high (FcH>FcM>FcL) according to operating condition; and a case where the three correction value setting maps MAPfcL, MAPfcM, MAPfcH of low, middle, high are provided for the carrier frequencies FcL, FcM, FcH of low, middle, high, respectively will be explained.

In the step S11, the torque correction value calculation unit 104a determines whether or not the present carrier frequency is the high carrier frequency FcH. In the case of determining that the present carrier frequency is the high carrier frequency FcH (the step S11: Yes), the torque correction value calculation unit 104a selects the high frequency correction value setting map MAPfcH in the step S13. On the other hand, in the case of determining that the present carrier frequency is not the high carrier frequency FcH (the step S11: No), the torque correction value calculation unit 104a determines whether or not the present carrier frequency is the middle carrier frequency FcM in the step S12. In the case of determining that the present carrier frequency is the middle carrier frequency FcM (the step S12: Yes), the torque correction value calculation unit 104a selects the middle frequency correction value setting map MAPfcM in the step S14. On the other hand, in the case of determining that the present carrier frequency is not the middle carrier frequency FcM (the step S12: No), the torque correction value calculation unit 104a selects the low frequency correction value setting map MAPfcL in the step S15, supposing that the present carrier frequency is the low carrier frequency FcL.

Then, in the step S16, by referring to the correction value setting map selected in the step S13, the step S14, or the step S15, the torque correction value calculation unit 104a calculates the torque command correction value dTm corresponding to the present torque command Tm and the present rotational speed ω. Then, in the step S17, the torque correction value calculation unit 104a calculates a torque command after correction Tmf by adding the torque command correction value dTm to the torque command Tm.

4. Embodiment 4

Next, the controller 1 according to Embodiment 4 will be explained. The explanation for constituent parts the same as those in Embodiment 1 will be omitted. Although the basic configuration and processing of the AC rotary machine 2 and the controller 1 according to the present embodiment are the same as those of Embodiment 1, it differs in that a plurality of correction value setting maps are provided in order to correspond to a plurality of modulation methods of PWM control.

In the present embodiment, the PWM signal generation unit 43 switches the modulation method of PWM control according to operating condition. As the modulation method, there are sine wave PWM control, third order harmonic wave injection PWM control, space vector PWM control, two phase modulation PWM control, and the like. The sine wave PWM control is a method that performs PWM control using the three phase AC voltage command values of sine waves without applying modulation, like Embodiment 1. The third order harmonic wave injection PWM control is a method that performs PWM control using three phase AC voltage command values obtained by applying a third order harmonic wave to the three phase AC voltage command values of sine waves. The space vector PWM control is a method that performs PWM control using three phase AC voltage command values obtained by applying one half of middle voltages of the three phase AC voltage command values of sine waves to the three phase AC voltage command values of sine waves. The two phase modulation PWM control is a method that fixes any one phase of the AC voltage command values to 0 or the DC power voltage Vdc, and modulates other two phases so that line voltage of the three phase AC voltage command values do not change.

Change of the modulation method of PWM control causes change of iron loss resistance of the AC rotary machine 2, switching loss of the inverter 10, deviation of the output torque to the torque command in the overmodulation region, and the like; and even if the torque command is the same, the output torque of the AC rotary machine 2 changes. Therefore, it is desirable to change the torque command correction value dTm according to change of the modulation method of PWM control.

Then, a plurality of correction value setting maps are provided for respective plurality of modulation methods of PWM control. Then, in each of the plurality of correction value setting maps, the map axes are subdivided in accordance with the overmodulation region and the control switching region.

The torque correction value calculation unit 104a calculates the torque command correction value dTm by referring to the correction value setting map of the modulation method performed currently.

Figure 17:
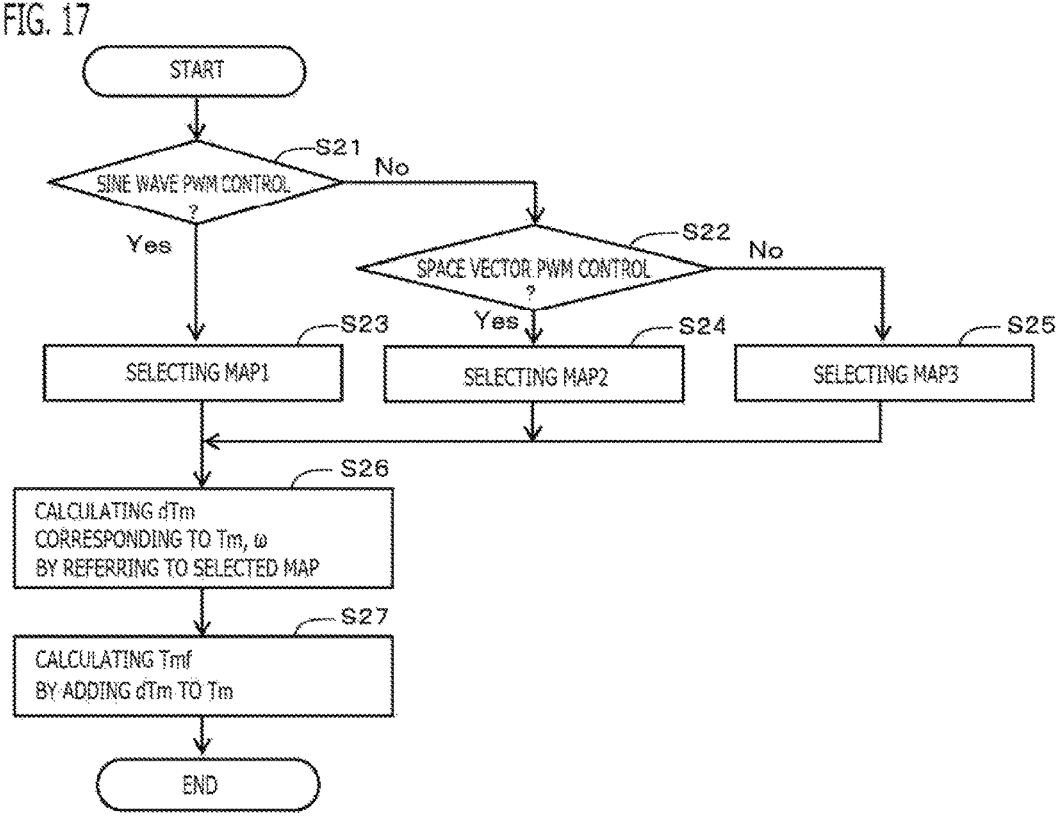
FIG. 17 is a flowchart showing processing of a torque correction value calculation unit according to Embodiment 4 of the present disclosure.

Hereinafter, using the flowchart of FIG. 17, the PWM signal generation unit 43 is configured to switch the modulation method to any one of sine wave PWM control, space vector PWM control, and two phase modulation PWM control according to operating condition; and a case where a correction value setting map MAP1 for sine wave PWM control, a correction value setting map MAP2 for space vector PWM control, and a correction value setting map MAP3 for two phase modulation PWM control are provided will be explained.

In the step S21, the torque correction value calculation unit 104a determines whether or not the present modulation method is sine wave PWM control. In the case of determining that the present modulation method is sine wave PWM control (the step S21: Yes), the torque correction value calculation unit 104a selects the correction value setting map MAP1 for sine wave PWM control in the step S23. On the other hand, in the case of determining that the present modulation method is not sine wave PWM control (the step S21: No), the torque correction value calculation unit 104a determines whether or not the present modulation method is space vector PWM control in the step S22. In the case of determining that the present modulation method is space vector PWM control (the step S22: Yes), the torque correction value calculation unit 104a selects the correction value setting map MAP2 for space vector PWM control in the step S24. On the other hand, in the case of determining that the present modulation method is not space vector PWM control (the step S22: No), the torque correction value calculation unit 104a selects the correction value setting map MAP3 for two phase modulation PWM control in the step S25, supposing that the present modulation method is two phase modulation PWM control.

Then, in the step S26, by referring to the correction value setting map selected in the step S23, the step S24, or the step S25, the torque correction value calculation unit 104a calculates the torque command correction value dTm corresponding to the present torque command Tm and rotational speed ω. Then, in the step S27, the torque correction value calculation unit 104a calculates a torque command after correction Tmf by adding the torque command correction value dTm to the torque command Tm.

5. Embodiment 5

Next, the controller 1 according to Embodiment 5 will be explained. The explanation for constituent parts the same as those in Embodiment 1 will be omitted. Although the basic configuration and processing of the AC rotary machine 2 and the controller 1 according to the present embodiment are the same as those of Embodiment 1, it differs in that feedback control of the output torque and feedback control of the voltage utilization factor are performed.

Figure 18:
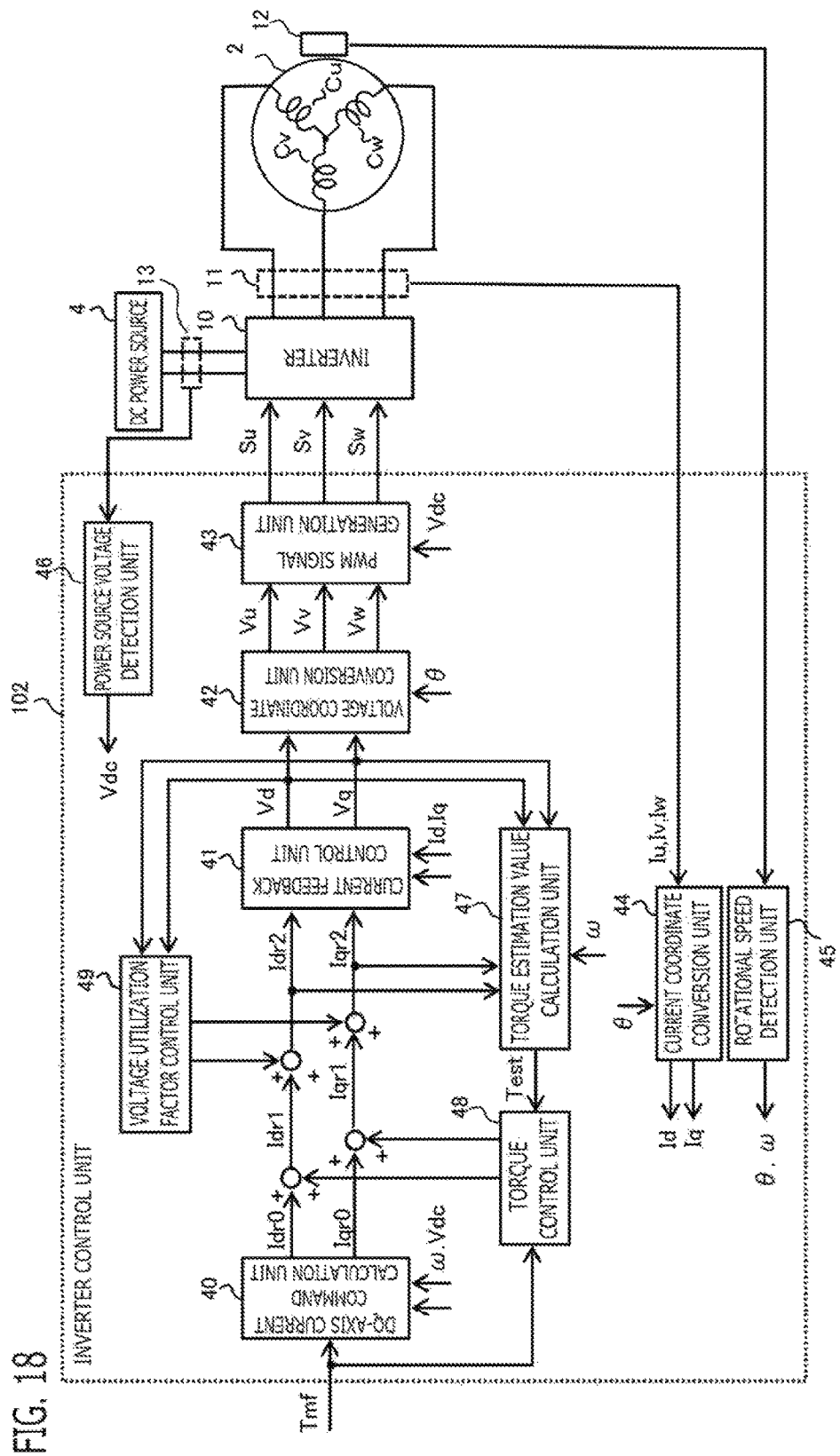
FIG. 18 is a block diagram of an inverter control unit according to Embodiment 5 of the present disclosure.

FIG. 18 is a schematic block diagram of the inverter control unit 102 and the like according to the present embodiment. The inverter control unit 102 is provided with a torque estimation value calculation unit 47, a torque control unit 48, and a voltage utilization factor control unit 49.

The torque estimation value calculation unit 47 estimates a torque of the AC rotary machine 2 based on the current commands and the voltage commands. In the present embodiment, the torque estimation value calculation unit 47 calculates the torque estimation value Test based on the dq-axis voltage command values Vd, Vq, the final dq-axis current command values Idr2, Iqr2, and the electrical angle speed ω using the next equation. Here, R is a preliminarily set coil resistance value, and Pn is a preliminarily set number of pole pairs.

$$\Phi d = (Vq - R \times Iqr2)/\omega$$

$$\Phi q = -(Vd - R \times Idr2)/\omega$$

$$Test = Pn \times (\Phi d \times Iqr2 - \Phi q \times Idr2) \quad (4)$$

The torque control unit 48 corrects the current commands so that the torque estimation value Test approaches the torque command after correction Tmf. In the present embodiment, as shown in the next equation, the torque control unit 48 calculates dq-axis current command values Idr1, Iqr1 after torque feedback correction, by correcting dq-axis current command values Idr0, Iqr0 by PI control based on a deviation dTest between the torque estimation value Test and the torque command after correction Tmf. Here, θtest is a correction direction of the dq-axis current commands where loss becomes the minimum, and the torque control unit 48 calculates θtest using an approximate expression and the like which is preliminarily set based on experimental result.

$$d\text{Test} = Tmf - \text{Test}$$

$$dIdqest = Kpest \times d\text{Test} + \int (Kiest \times d\text{Test})dt$$

$$Idr1 = Idr0 + dIdqest \times \cos(\theta test)$$

$$Iqr1 = Iqr0 + dIdqest \times \sin(\theta test) \quad (5)$$

Since nonlinearity of setting of the current commands and the voltage commands increases in the overmodulation region and the switching region of the control method, change of the torque estimation value becomes large and change of the current commands and the voltage commands by torque feedback control becomes large. Therefore, by performing torque feedback control, in the overmodulation region and the switching region of the control method, change of the output torque to change of the rotational speed ω and the torque becomes large. As described in Embodiment 1, since the map axis of the correction value setting map is subdivided in the overmodulation region and the switching region of the control method, deviation of the output torque to the torque command Tm can be compensated with good accuracy.

The voltage utilization factor control unit 49 calculates a voltage utilization factor MR* which is a ratio of a line voltage of the voltage commands to the DC power voltage Vdc supplied to the inverter 10. In the present embodiment, the voltage utilization factor control unit 49 calculates the voltage utilization factor MR* based on the dq-axis voltage command values Vd, Vq, and the DC power voltage Vdc using the next equation.

$$MR^* = \sqrt{(Vd2 + Vq2)}/Vdc \times \sqrt{2} \quad (6)$$

The voltage utilization factor control unit 49 corrects the current commands so that the voltage utilization factor MR* approaches a target voltage utilization factor MR0. In the present embodiment, as shown in the next equation, the voltage utilization factor control unit 49 calculates dq-axis current command values Idr2, Iqr2 after voltage utilization factor feedback correction, by correcting the dq-axis current command values Idr1, Iqr1 after torque feedback correction by PI control based on a deviation dMR between the voltage utilization factor MR* and the target voltage utilization factor MR0. Here, θmr is a correction direction of dq-axis current commands where change of the voltage utilization factor MR* becomes the maximum, and the voltage utilization factor control unit 49 calculates θmr using an approximate expression and the like which is preliminarily set based on experimental result.

$$dMR = MR0 - MR^*$$

$$dIdqmr = Kpmr \times dMR + \int (Kimr \times dMR)dt$$

$$Idr2 = Idr1 + dIdqmr \times \cos(\theta mr)$$

$$Iqr2 = Iqr1 + dIdqmr \times \sin(\theta mr) \quad (7)$$

Since nonlinearity of setting of the voltage commands increases in the overmodulation region and the switching region of the control method, change of the voltage utilization factor MR* becomes large, and change of the current commands and the voltage commands by voltage utilization factor feedback control becomes large. Therefore, by performing voltage utilization factor feedback control, in the overmodulation region and the switching region of the control method, change of the output torque to change of the rotational speed ω and the torque becomes large. As described in Embodiment 1, since the map axis of the correction value setting map is subdivided in the overmodulation region and the switching region of the control method, deviation of the output torque to the torque command Tm can be compensated with good accuracy.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where the inverter control unit 102 controls on/off of a plurality of switching devices, which the inverter 10 has, by current feedback control using the vector control method, based on the torque command after correction Tmf. However, the embodiments of the present disclosure are not limited to this example. That is to say, the inverter control unit 102 may be configured to control on/off of the plurality of switching devices, which the inverter 10 has, by other control methods such as V/F control, based on the torque command after correction Tmf. For example, if V/F control is used, the inverter control unit 102 may be configured to calculate three phase AC voltage command values Vu, Vv, Vw of sine waves which oscillate at rotational frequency of the AC rotary machine 2, and change an amplitude of the three phase AC voltage command values Vu, Vv, Vw according to the torque command after correction Tmf.

(2) In the above-mentioned Embodiment 1, there has been explained the case where using one correction value setting map, subdivision of map axes is performed in the overmodulation region and the switching region of the control method. However, the embodiments of the present disclosure are not limited to this example. That is to say, using two correction value setting maps which consists of a correction value setting map for the overmodulation region and the switching regions of the control method with subdivided map axes, and a correction value setting map for other regions with a rough map axes, the torque correction value calculation unit 104a may be configured to switch the two correction value setting maps according to whether or not it is in the overmodulation region or the switching region of the control method.

(3) In the above-mentioned Embodiment 1 through 3, and 5, there has been explained the case where modulation such as two phase modulation PWM control is not performed to the three phase AC voltage command values Vu, Vv, Vw. However, the embodiments of the present disclosure are not limited to this example. That is to say, the PWM signal generation unit 43 may perform modulation such as third order harmonic wave injection PWM control, space vector PWM control, two phase modulation PWM control in at least the overmodulation region. Even if modulation is performed in the overmodulation region, since it is a region where nonlinearity becomes high; by subdividing map axes, deviation of the output torque to the torque command Tm can be compensated with good accuracy.

(4) There has been explained the cases where in the above-mentioned Embodiment 2, the referred correction value setting map is switched according to the DC power voltage Vdc; in the above-mentioned Embodiment 3, the referred correction value setting map is switched according to the carrier frequency; and in the above-mentioned Embodiment 4, the referred correction value setting map is switched according to the modulation method of PWM control. However, the embodiments of the present disclosure are not limited to these examples. That is to say, if any two or three parameters in the DC power voltage Vdc, the carrier frequency, and the modulation method of PWM control are made changeable, a number of correction value setting maps which can deal with the combination of two or three parameters made changeable are prepared, and the torque correction value calculation unit 104a may be configured to switch the referring correction value setting map according to any two or three parameters in the DC power voltage Vdc, the carrier frequency, and the modulation method of PWM control.

Various modifications and alterations of this disclosure will be apparent to those skilled in the art without departing from the scope and spirit of this disclosure, and it should be understood that this is not limited to the illustrative embodiments set forth herein.

What is claimed is:

1. An AC rotary machine controller for controlling an AC rotary machine via an inverter, the AC rotary machine controller comprising:
   a torque command setting calculator that sets a torque command;
   a torque command correction calculator that calculates a torque command correction value based on the torque command and a rotational speed of the AC rotary machine, and calculates a torque command after correction obtained by correcting the torque command by the torque command correction value; and
   an inverter controller that controls on/off of a plurality of switching devices which the inverter has, based on the torque command after correction,
   wherein the torque command correction calculator calculates the torque command correction value corresponding to the present torque command and the present rotational speed, by referring to a correction value setting map in which the torque command and the rotational speed were set as map axes, and the torque command correction value was set as map setting data, and
   wherein in the correction value setting map, one or both of a torque axis unequal interval setting that sets interval of torque command map axis to unequal interval in the each rotational speed; and a rotation axis unequal interval setting that sets interval of rotational speed map axis to unequal interval were done.

2. The AC rotary machine controller according to claim 1, wherein in the correction value setting map, one or both of a rotation axis overmodulation subdivision setting that sets the interval of the rotational speed map axis in an overmodulation rotational speed range more finely than that in a low rotation speed range where the rotational speed is lower than the overmodulation rotational speed range, wherein the overmodulation rotational speed range is a range of the rotational speed which becomes an overmodulation region where an amplitude of fundamental wave frequency component of AC voltage applied to windings of the AC rotary machine becomes larger than DC power voltage supplied to the inverter; and
   a torque axis overmodulation subdivision setting that sets, in the each rotational speed, the interval of the torque command map axis in an overmodulation torque command range more finely than that in a low torque command range where the torque command is lower than the overmodulation torque command range, wherein the overmodulation torque command range is a range of the torque command which becomes the overmodulation region were done.

3. The AC rotary machine controller according to claim 2, wherein in the correction value setting map, the interval of the torque command map axis was gradually set finely as the torque command becomes large, in the overmodulation torque command range of the each rotational speed.

4. The AC rotary machine controller according to claim 1, wherein the inverter controller selects and performs a maximum torque/current control that maximizes a generated torque for the same current, or a voltage limiting control that maintains an induced voltage generated in windings of the AC rotary machine at a voltage limiting value, according to operating point of the rotational speed and the torque command, and
   wherein in the correction value setting map, the interval of the rotational speed map axis in a control switching rotational speed range is set more finely than that in the low rotation speed range where the rotational speed is lower than the control switching rotational speed range, wherein the control switching rotational speed range is a range of the rotational speed where the maximum torque/current control and the voltage-limiting control are switched.

5. The AC rotary machine controller according to claim 1, wherein the inverter controller, by referring to a maximum torque setting map in which a relationship among the rotational speed, a DC power voltage, and a maximum torque which the AC rotary machine can output in the each rotational speed is preliminarily set, calculates the maximum torque corresponding to the present rotational speed and the present DC power voltage, and calculates a torque command ratio obtained by dividing the present torque command by the present maximum torque, then by referring to the correction value setting map in which the torque command ratio was set as the torque command map axis, the rotational speed was set as the map axis, and the torque command correction value was set as the map setting data, calculates the torque command correction value corresponding to the present torque command ratio and the present rotational speed.

6. The AC rotary machine controller according to claim 1, wherein a plurality of the correction value setting maps are provided for respective plurality of DC power voltages which are different mutually, and wherein the torque command correction calculator, by referring to the two correction value setting maps of the two DC power voltages near the present DC power voltage currently supplied to the inverter, calculates the two torque command correction values, and calculates a value obtained by interpolating the two torque command correction values based on the present DC power voltage, as the final torque command correction value.

7. The AC rotary machine controller according to claim 1, wherein the inverter controller controls on/off of the plurality of switching devices by PWM control, and changes carrier frequency of a carrier wave used for the PWM control, wherein a plurality of the correction value setting maps are provided for respective plurality of the carrier frequencies which are different mutually, and wherein the torque command correction calculator calculates the torque command correction value, by referring to the correction value setting map corresponding to the present carrier frequency.

8. The AC rotary machine controller according to claim 1, wherein the inverter controller performs PWM control of a plurality of modulation methods, wherein a plurality of the correction value setting maps are provided for respective plurality of modulation methods, and wherein the torque command correction calculator calculates the torque command correction value, by referring to the correction value setting map corresponding to the currently performing modulation method.

9. The AC rotary machine controller according to claim 1, wherein the inverter controller calculates current commands which flow into windings of the AC rotary machine, based on the torque command after correction, calculates voltage commands applied to the winding of the AC rotary machine so that actual currents approach the current commands, controls on/off of the plurality of switching devices by PWM control based on the voltage commands, calculates a voltage utilization factor which is a ratio of a line voltage of the voltage commands to a DC power voltage supplied to the inverter, and corrects the current commands so that the voltage utilization factor approaches a target voltage utilization factor, and estimates a torque of the AC rotary machine based on the current commands and the voltage commands, and corrects the current commands so that the estimated torque approaches the torque command after correction.

\* \* \* \* \*